United States Patent [19]

Davis, Jr. et al.

[11] Patent Number: 4,785,895
[45] Date of Patent: Nov. 22, 1988

[54] DRILL BIT WITH WEAR INDICATING FEATURE

[75] Inventors: Albert P. Davis, Jr., Houston; Joseph W. Stolle, Wharton, both of Tex.

[73] Assignee: Exxon Production Research Company, Houston, Tex.

[21] Appl. No.: 166,593

[22] Filed: Mar. 10, 1988

[51] Int. Cl.⁴ ............................................. E21B 12/02
[52] U.S. Cl. .................................................. 175/39
[58] Field of Search ........................ 175/39, 40; 73/151

[56] References Cited

U.S. PATENT DOCUMENTS

| | | | |
|---|---|---|---|
| 2,239,106 | 4/1941 | Krall | 255/61 |
| 2,560,328 | 7/1951 | Bielstein | 255/61 |
| 2,580,860 | 1/1952 | Stokes | 255/61 |
| 2,925,251 | 2/1960 | Arps | 255/1.8 |
| 3,011,566 | 12/1961 | Graham | 175/39 |
| 3,062,302 | 11/1962 | Toth et al. | 175/39 |
| 3,345,867 | 10/1967 | Arps | 73/151 |
| 3,363,702 | 1/1968 | Bielstein | 175/39 |
| 3,853,184 | 12/1974 | McCullough | 175/39 |
| 4,655,300 | 4/1987 | Davis et al. | 175/39 |

Primary Examiner—Stephen J. Novosad
Assistant Examiner—Terry Lee Melius
Attorney, Agent, or Firm—Richard F. Phillips

[57] ABSTRACT

An earth drilling bit incorporating a tensioned linkage type bit wear indicator. A tensioned linkage extends through the bit between a wear sensor and a device for altering the resistance of the bit to receiving drilling fluid from the drill string. On detecting a predetermined degree of wear, the wear sensor releases the tension in the tensioned linkage. This activates the flow resistance altering device, causing the flow rate and/or pumping pressure of the drilling fluid to change. The tensioned linkage passes through two intersecting passageways in the bit. A guide element is inserted at the intersection of the two intersecting passageways. The guide element routes the tensioned linkage between the two passageways.

10 Claims, 3 Drawing Sheets

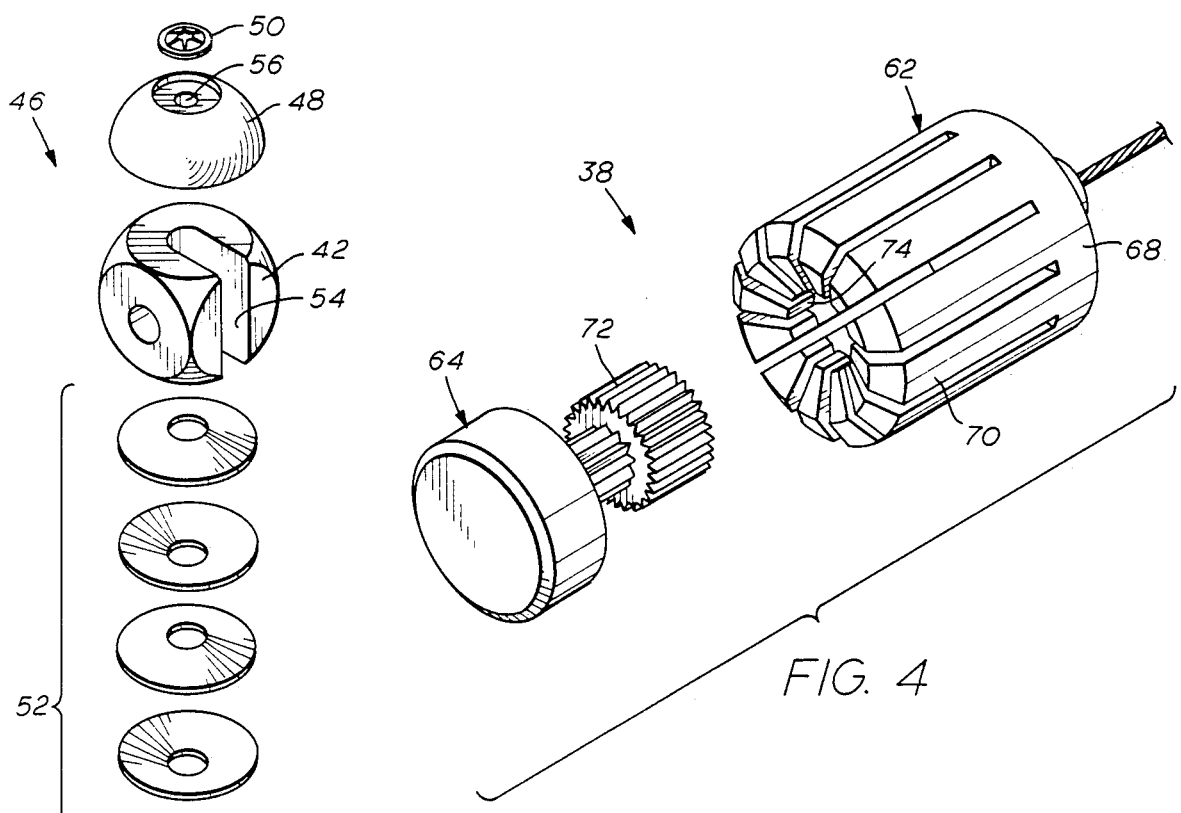
FIG. 4
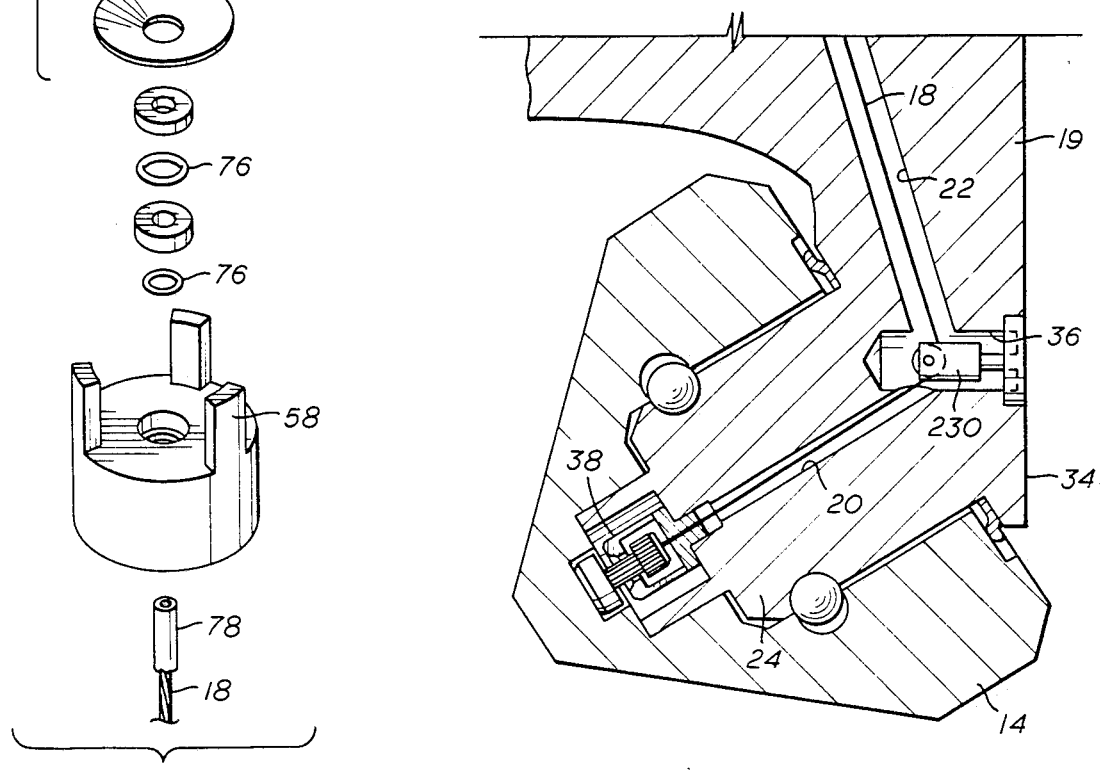
FIG. 3
FIG. 5

DRILL BIT WITH WEAR INDICATING FEATURE

FIELD OF THE INVENTION

The present invention relates generally to bits used in drilling earth formations. More specifically, the present invention concerns a drill bit incorporating a feature causing it to indicate when it has reached a predetermined state of wear.

BACKGROUND OF THE INVENTION

Modern drilling operations used to create boreholes in the earth for the production of oil, gas, and geothermal energy typically employ rotary drilling techniques. In rotary drilling, a borehole is created by the rotation of a tubular drill string having a drill bit secured to its lower end. As drilling proceeds, additional tubular segments are periodically added to the drill string to deepen the hole. While drilling, a pressurized fluid is continually injected into the drill string. This fluid passes into the borehole through nozzles in the drill bit and returns to the surface through the annular channel between the drill string and the walls of the borehole. The drilling fluid carries the rock cuttings out of the borehole, cools and lubricates the drill bit, and serves several other functions.

The most common type of bit used in rotary drilling is known as a rotary-cone bit. Rotary-cone bits have a number of spindles at their lower end with each spindle serving as an axle for a cutting element, commonly referred to as a cone. The spindles and cones are configured so that a cutting face of each cone rests on the bottom of the borehole. As the bit is rotated, the cones rotate on the spindles. The exposed surface of each cone is provided with steel teeth or carbide inserts which penetrate into the bottom of the borehole as the drill string turns.

Drill bits undergo wear in the course of drilling operations. One type of wear is the dulling of the cutting elements. This causes the penetration rate of the bit to decrease. This is readily observable at the surface, permitting the driller to pull the drill string at the appropriate point to replace the bit.

There are other types of wear, not readily apparent at the surface, which have posed longstanding problems for the industry. One of these types of wear is specific to roller-cone bits. In drilling with a roller-cone bit, the bearing surfaces between each cone and spindle will wear. As these surfaces wear, the cone will generally begin to rotate eccentrically about the spindle. As bearing wear progresses, this eccentric rotation increases until the cone seizes or falls off the spindle. If a bit bearing should fail and leave a cone in the wellbore, it is often necessary to withdraw the drill string and suspend drilling operations until the lost cone can be fished from the well. The resulting delay can be very expensive, Particularly in offshore wells.

It has long been desired to develop an inexpensive and reliable means of indicating when a bit is about to lose a cone. At present, drillers often elect to replace the bit well before they think it likely that a problem has developed to avoid the possibility of needing to fish a cone from the well. Oftentimes, the bits are discovered to have considerable life remaining when they are brought to the surface. If there were some means for determining when bearing wear has reached the point where further drilling poses the risk of losing a cone, each bit could be used for its maximum effective life without risking the downtime that a lost cone entails.

U.S. Pat. No. 4,655,300, issued to Davis et al. on Apr. 7, 1987, discloses a type of monitor which has shown considerable promise as a practical solution to detecting and indicating bit bearing wear. This monitor includes a wear sensor, a ball for blocking a drilling fluid jet, and a tensioned wire which controls a device retaining the ball away from the jet until the sensor detects a predetermined degree of wear. One problem with this monitor is that the operation of drilling passages for the tensioned wire has required considerable attention to ensure that the several passages required for each monitor meet at the desired point in the bit body. Threading the tensioned wire through the sharp intersection created by the drilling operation also poses a problem. It would be desirable to develop an improved monitor design and fabrication method in which these problems are avoided.

SUMMARY OF THE INVENTION

The present invention is directed to an earth drilling bit adapted to sense and indicate when a specific portion of the bit has reached a predetermined degree of wear. The bit incorporates a wear indicator having the following principal features: a wear sensor; means for altering the drilling fluid flow resistance of the bit; and, a tensioned linkage secured between the wear sensor and the flow resistance altering means. On sensing a predetermined degree of wear, the wear sensor relieves the tension on the tensioned linkage. This activates the flow resistance altering means, causing a significant change in the flow rate and/or pumping pressure of the drilling fluid. This change is detected at the drilling rig and the driller may then decide to pull the drill string to change the bit.

A first preferred embodiment of the bit wear indicator is adapted for monitoring the wear of the cone bearings of a roller-cone bit. The tensioned linkage extends through two intersecting passageways drilled through the bit. A guide element is situated within the bit at the juncture of the two passageways. The guide element is fabricated separately from the bit body, and is inserted into the bit body either through one of the two intersecting passageways or through a third passageway drilled to reach the juncture of the first two passageways. In the preferred embodiment, the guide element provides three principal benefits. It simplifies the bit wear indicator assembly process by guiding the tensioned linkage through the intersection of the first and second passageways; it increases the allowed tolerance in drilling the first and second passageways; and, it decreases the stress raiser in the tensioned linkage where it must bend at the juncture between the first and second passageways.

BRIEF DESCRIPTION OF THE DRAWINGS

For a better understanding of the present invention, reference may be had to the drawings, in which:

FIG. 3 is an exploded view of the blocking element retaining means of the embodiment shown in FIG. 2;

FIG. 4 is an exploded view of the bearing wear sensor of the embodiment shown in FIG. 3;

FIG. 5 is a view in vertical section of a single leg of a rotary-cone bit incorporating an alternate embodiment of the present invention in which the guide element also serves as a gauge wear monitor;

These drawings are not intended to in any way define the present invention, but are provided solely for the purpose of illustrating certain preferred embodiments and applications of the present invention.

DESCRIPTION OF THE PREFERRED EMBODIMENTS

Introduction

Figure 2:
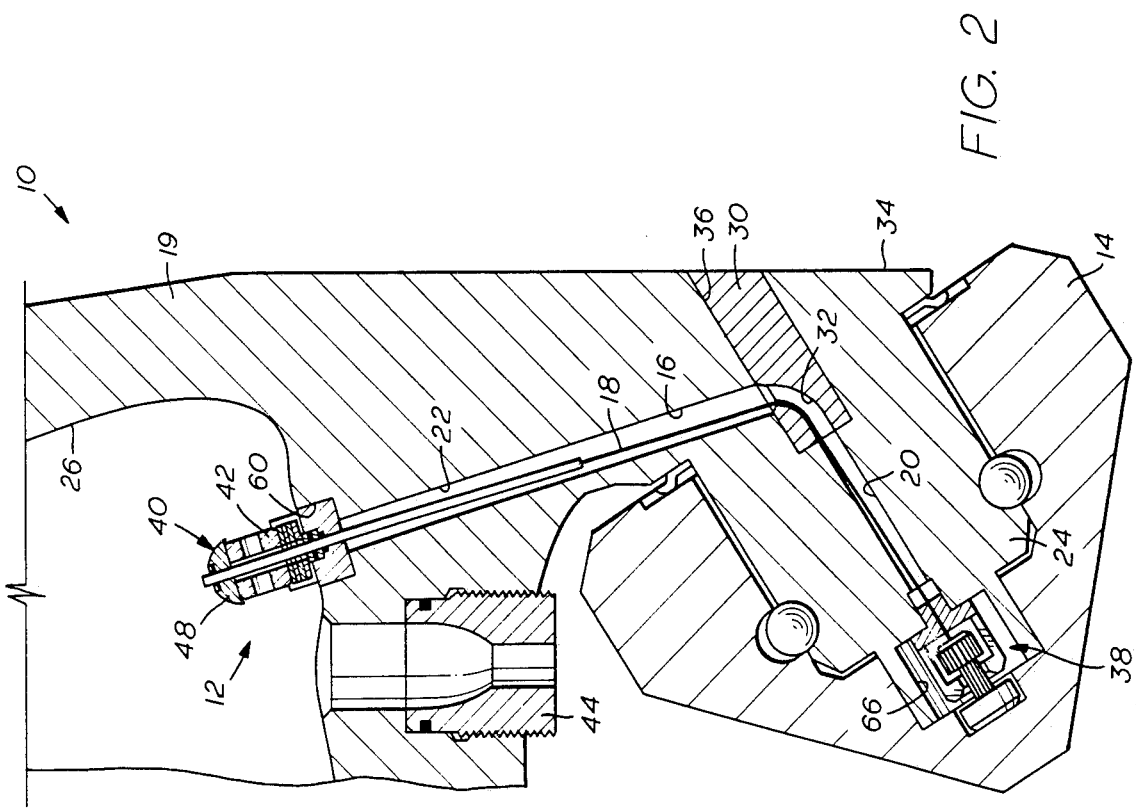
FIG. 2 shows a view in vertical section of a single leg of a rotary-cone bit incorporating a preferred embodiment of the present invention.

FIG. 2 illustrates a rotary cone drill bit 10 incorporating a preferred embodiment of the present invention. This bit 10 includes a bit wear indicator 12 for sensing and indicating when cone bearing wear has reached the point at which further drilling would entail risk of losing a cone 14 in the wellbore. Loss of a cone 14 is a serious problem which often necessitates a time-consuming "fishing" operation to remove the cone from the wellbore.

Figure 1:
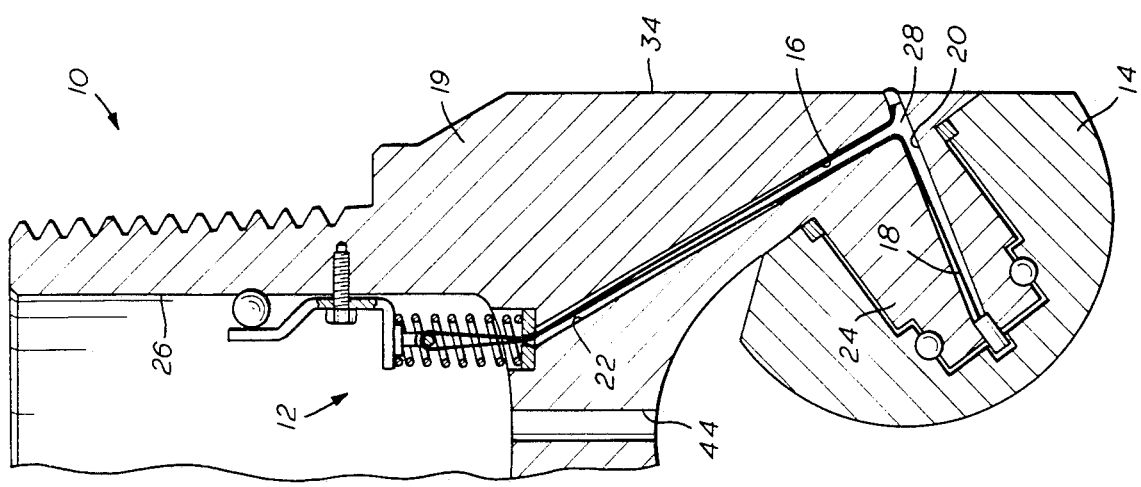
FIG. 1 shows a view in vertical section of a single leg of a prior art rotary-cone bit incorporating a tensioned wire type bearing wear indicator.

The bit wear indicator 12 used in the present invention is of the tensioned linkage type. A significant difficulty with prior art tensioned linkage type bit wear indicators, such as that shown in FIG. 1, concerns manufacturing problems associated with the passageway 16 through which the tensioned linkage 18 extends within the bit body 19. The passageway 16 requires the drilling of two lengthy, small diameter, intersecting holes, henceforth referred to as first and second passageway segments 20, 22. The first of these extends through the spindle 24 and the second extends from the central bit chamber 26 to intersect the first passageway segment 20. It should be noted that in all of the appended FIGURES, the passageway 16 is shown having an exaggerated diameter for the purpose of clarity. In the preferred embodiment, the diameter of the passageway 16 is relatively small, 0.3 inches (7.5 mm) or less, to avoid weakening the bit 10.

In establishing the prior art passageway, ensuring proper intersection of the two passageway segments 20, 22 requires a degree of accuracy in the drilling operation which can be difficult and expensive to obtain. Further, even where the passageway segments 20, 22 are drilled with perfect accuracy, it can be difficult to thread the tensioned linkage 18 around the intersection 28 between the segments 20, 22. Also, the sharp interior corner at the intersection must be rounded to avoid imposing a high stress raiser on the tensioned linkage. This is a difficult operation because the intersection can be accessed only through the passageway segments 20, 22.

These problems are overcome in the present invention through the use of a guide element 30 positioned at the intersection of the two passageway segments 20, 22. This guide element 30 is best shown in FIG. 2. The guide element 30 is fabricated separately from the main body of the drill bit 10 and is inserted into the passageway segment intersection 28 to serve as a fairlead roundabout which provides a relatively large radius of curvature for taking the tensioned linkage 18 through the angle at which the two passageway segments 20, 22 intersect.

The Guide Element

The guide element 30 is easily manufactured and installed and serves to greatly decrease the directional tolerance required in drilling both passageway segments 20, 22. The preferred bit wear indicator 12, to be described in greater detail below, uses a metallic wire as the tensioned linkage 18. This wire 18 is threaded through the tensioned linkage passageway 16 starting from the central bit chamber 26. The guide element 30 defines a curved passageway 32 which is provided with a broad chamfer at the point it intersects the second passageway segment 22. The diameter of the chamfer defines the tolerance required in drilling the second passageway segment 22. The guide element curved passageway 32 is concentric with the first passageway segment 20 at their point of intersection. This is achieved by making the exit of the guide element passageway 32 concentric with the guide element 30 itself and ensuring that the guide element 30 is coaxial with the first passageway segment 20.

Achieving the desired alignment of the guide element 30 and first passageway segment 20 is a simple operation. In drilling the first passageway 20, the first passageway segment 20 is drilled from the spindle 24 fully through the shirt-tail 34 of the bit 10. This hole exiting through the shirt-tail 34 is then used as a pilot for drilling the bore 36 in which the guide element 30 is situated. In this manner, concentricity of the first passageway segment 20 and the bore 36 is obtained, thus ensuring perfect alignment of the guide element 30 with the first passageway segment 20.

The guide element 30 can be made of any metal which is compatible and can be welded to the main bit body. The guide element 30 is preferably sized so that on insertion into the bore 36 it is recessed slightly within the shirt-tail 34. This recessed area can be filled with weld material and then ground to match the contour of the shirt-tail 34. This locks the guide element 30 in place and eliminates the possibility of fluid leakage past the guide element 30. As an alternative to welding the guide element 30 in place, those skilled in the art will recognize that an interference fit could also be used.

Other Elements of the Preferred Bit Wear Indicator

Having described a preferred embodiment of the guide element 30, which serves as a key feature of the present invention, a preferred bit wear indicator 12 incorporating the guide element 30 will now be described. As shown in FIG. 2, the bit wear indicator 12 broadly includes the following principal components: the tensioned linkage 18; the guide element 30; a wear sensor 38; and, means 40 for altering the drilling fluid flow resistance of the bit 10 in response to a change in the tension of the tensioned linkage 18. In the preferred embodiment, the flow resistance altering means 40 includes an element 42 for blocking a drilling fluid port (nozzle) 44 and means 46 for retaining the blocking element 42 at a fixed position within the bit 10 until the tension in the tensioned linkage 18 is reduced.

Operation of the bit wear indicator 12 is straight-forward. When the wear sensor 38 detects a predetermined degree of wear, it releases the end of the tensioned linkage 18 connected to it. This relieves the tension of the tensioned linkage 18, causing the blocking element 42 to be released into the central bit chamber 26. The flow of drilling fluid through the central bit chamber 26 carries the blocking element 42 into one of the drilling fluid ports 44, reducing or completely stopping the flow of drilling fluid therethrough. This causes a significant change in the flow rate and/or pumping pressure of the drilling fluid. This pressure increase serves to indicate to the driller that the predetermined wear limit of the bit 10 has been reached.

As discussed above, a principal component of the bit wear indicator 12 is means 40 for altering the drilling fluid flow resistance of the bit 10 in response to a change in the tension of the tensioned linkage 18. More broadly, however, the flow resistance altering means 40 can be any system for increasing or decreasing the resistance of the bit 10 to drilling fluid flow.

For example, as an alternative to use of the blocking element 42 and retaining means 46, the flow resistance altering means 40 could be a port in the bit body 19 which is controlled by a valve adapted to open or close the port in response to a reduction in the tension of the tensioned linkage 18. This would serve to decrease or increase, respectively, the resistance of the bit 10 to drilling fluid flow, thus serving to indicate that the predetermined wear condition has occurred.

FIG. 3 shows an exploded view of a preferred embodiment of the port blocking element 42 and the retaining means 46. The blocking element 42 is preferably designed to obstruct, but not completely block, the flow of drilling fluid through the port 44. This may be accomplished by providing the blocking element 42 with holes extending through it, as shown in FIG. 2. This prevents the possibility of completely losing the ability to circulate drilling fluid in the event all of the wear sensors 38 are activated. In some applications it will be desirable to make the blocking element 42 out of a material which will erode and vacate the port 44 after a short time in place so that the driller can regain unrestricted circulation a few minutes after activation of the wear sensor 38.

The retaining means 46 includes the following principal components: a retainer element 48; means 50 for securing the tensioned linkage 18 to the retainer element 48 so that when under tension, the tensioned linkage 18 biases the retainer element 48 toward the bit body 19 to retain the blocking element 42 in a fixed position; and, a spring 52 for biasing the retainer element 48 away from the bit body 19 so that when the tension in the tensioned linkage 18 is relieved, the retainer element 48 is biased away from the bit body 19 to free the blocking element 42. In the preferred embodiment, the retainer element 48 is a small dome-shaped piece which rests atop the blocking element 42. The tensioned linkage 18 extends through a slot 54 in the blocking element 42 and a central hole 56 in the retainer element 48. A pushnut fastener, preferably a sleevelock, serves as the means 50 for securing the tensioned linkage 18 to the retainer element 48. The pushnut fastener 50 is locked to the tensioned linkage 18 immediately above the retainer element 48. When the tensioned linkage 18 is tensioned, the pushnut fastener 50 bears against the retainer element 48 to force it downward against the blocking element 42 to retain the blocking device 42 in a fixed position.

In the preferred embodiment, the retaining means 46 also includes a base portion 58 which is seated in a counterbore 60 in the bit body 19. The spring 52 is interposed in compression between the base portion 58 and the blocking device 42. When the tension on the tensioned linkage 18 is relieved, the spring 52 forces the blocking element 42 and retainer element 48 upward away from the base portion 46. At this point, the blocking element 42 is no longer tightly retained between the spring 52 and the retainer element 48. This causes the blocking device 42 to fall off the tensioned linkage 18 and enter one of the ports 44 under the action of the drilling fluid passing through the drill bit 10.

As illustrated in FIG. 3, the spring 52 is preferably a Belleville type spring. Each element of the Belleville type spring has a central aperture through which the tensioned linkage 18 passes. The spring 52 could alternately be a bow spring, a helical spring or other type of spring. For most applications it will be desirable that the spring 52 be made of a metal such as ELGILOY® which is adapted to withstand the high temperatures occurring in weld-up of the bit legs, and which is also adapted to survive the hostile drilling environment.

The preferred embodiment of the flow resistance altering means 40 described above provides many advantages. Because the tensioned linkage 18 passes through apertures in each element of the blocking element retaining means 46, each of these elements is retained in place on release of the blocking element 42. Because all of the elements are concentrically loaded, the size and complexity of the flow resistance altering means 40 is reduced. The blocking element 42 is completely captured by the retaining means 46 itself, so there is no need for a detent in the inner wall of the bit body 19 for retaining the blocking element 42. All components of the retaining means 46 are very simple and may be inexpensively produced on a screw machine, investment cast or stamped. Also, as will be described more fully below, the simplicity of the preferred embodiment of the retaining means 46 simplifies sealing the tensioned linkage 18 against the entry of drilling fluid into the bit body passageway 16 through which the tensioned linkage 18 extends.

Broadly, the wear sensor 38 can be any element adapted to sense wear of any region of the bit 10 and relieve the tension in the tensioned linkage 18 in response to the occurrence of a predetermined degree of wear. FIGS. 2 and 4 illustrate the preferred embodiment of a wear sensor 38 adapted for sensing wear of the bit bearing of a roller-cone bit. This preferred wear sensor takes the form of a torsional and tensional trigger. Once the bearing has worn to the point that cone 14 rotates with sufficient eccentricity, the sensor 38 rotates the tensioned linkage 18 until it fails due to torsional strain.

As best shown in FIG. 4, the two principal components of the preferred wear sensor 38 are a tensioned linkage end termination element 62 and means 64 for causing the end termination element 62 to rotate in response to the occurrence of a predetermined degree of bearing wear. The end termination element 62 preferably takes the form of a snap ring type element such as a collet located in a recess 66 in the end face of the spindle 24. By recessing the collet 62 within the spindle 24, the potential for damaging the collet 62 in the course of bit assembly is minimized. The base 68 of the collet 62 bears on the bottom of the spindle recess 66. The tensioned linkage 18 is secured to the collet base 68. Thus, the collet 62 anchors one end of the tensioned linkage 18 against the spindle 24. The fingers 70 of the collet 62 project outwardly from collet base 68 to encircle a central axis substantially coaxial with the spindle 24.

The rotation causing means 64 preferably takes the form shown in FIG. 4. The rotation causing means 64 is secured to the cone 14 and projects into the collet 62 along the axis of cone rotation. The rotation causing means 64 has an enlarged end portion 72 with an outer diameter slightly smaller than the inner surface defined by the collet fingers 70. Accordingly, so long as the axis of rotation of the cone 14 lies on the axis of the spindle 24, the rotation causing means 64 does not interfere with the collet 62. However, when the bearing surface between the cone 14 and spindle 24 becomes sufficiently worn, the resulting eccentric rotation of the cone 14 will cause the enlarged end portion 72 of the rotation causing means 64 to interfere with the collet fingers 70. This causes the collet 62 to twist as the cone 14 rotates. As shown in the FIGURES, the outer surface of the rotation causing element 64 may be provided with axially extending grooves to enhance its ability to engage and rotate the collet 62.

An additional feature of the preferred wear sensor 38 is that it will also sever the tensioned linkage 18 in response to the cone 14 moving a short distance axially outward along the spindle 24 from its design position. This is achieved by interference between the enlarged end portion 72 and a reduced diameter section 74 at the collet opening. This reduced diameter collet section 74 is chamfered inward to permit the rotation causing means 64 to spread the collet fingers 70 and be received within the collet 62 during assembly. However, following assembly the rotation causing means 64 cannot be withdrawn from the collet 62. Thus, if the cone 14 moves even a short axial distance away from its design position, it pulls the collet 62 and tensioned linkage 18 with it. This axial movement will exceed the ultimate tensile strength of the tensioned linkage 18, which will cause it to sever, releasing the blocking element 42.

The tensioned linkage 18 can assume many forms. We have found that a seven strand 0.023 inch (0.53 mm) wire made of MP-35N, a high strength, corrosion resistant alloy, works particularly well. Those skilled in the art will recognize that many other types of wires, both metallic and non-metallic, and other types of tension bearing elongated elements will also serve the purpose.

We have discovered that it is important to prevent the intrusion of drilling fluid into the passageway through which the tensioned linkage 18 extends in the bit body 19. This intrusion could permit drilling fluid to enter the bearing area, over-pressuring the bearing area and accelerating bearing wear. Such intrusion could also cause drilling fluid solids to pack off in the passageway, locking the tensioned linkage 18 in place to impede proper functioning of the bit wear indicator 12. Accordingly, it is desirable to establish a seal 76 to prevent fluid flow along the tensioned linkage 18. In the preferred embodiment, shown in FIGS. 2 and 3, this is accomplished by placing one or more elastomer O-rings around the tensioned linkage 18 to seal off the region between the tensioned linkage 18 and the base portion 58 of the retaining means 46. To prevent wicking leakage between individual strands of a multistrand flexible wire when used as the tensioned linkage 18, the upper portion of the wire 18 is jacketed in a thin-walled sleeve 78 of a corrosion resistant alloy which is soldered to the wire 18. This provides the upper portions of the wire 18 with a continuous, smooth outer surface which greatly facilitates establishing an efficient seal. An alternate method of sealing the multistrand wire is to swedge the thin wall sleeve 78 to the wire 18 and impregnate a suitable "Loc-tite" sealing fluid into the sleeve/wire assembly.

Installation

The bit wear indicator 12 is preferably incorporated into the individual bit legs before they are joined together. First, the two passageway segments 20, 22 and the guide element bore 36 are drilled as described previously. The guide element 30 is then installed in the proper orientation and secured in place. The counterbores 60, 66 for the retaining means base portion 58 and the collet 62 can be machined at any stage up to this point which is convenient for these operations. From this point, the bit wear indicator 12 is easily and quickly installed using hand labor. The wire 18 is preassembled to the thin-walled sleeve 78. The wire 18 is threaded through the second passageway 22 until it emerges through the collet counterbore 66. The wire 18 is secured to the collet base 68 of the collet 62 by swedging. The blocking element 42 and the elements of the retaining means 46 are then threaded onto the thin-walled sleeve 78 in the proper order. A sleevelock 50 is then placed on the thin-walled sleeve 78. The sleevelock 50 is oriented to permit the sleeve 78 to pass through it only in the upward direction. A tensioning tool (not shown) is inserted above the sleevelock and grips the upper portion of the sleeve 78 while forcing the sleevelock down against the retainer element 48. This forces the sleevelock 50 down over the sleeve 78 until all the elements of the bit wear indicator 12 are fully seated and the spring 52 is fully compressed. The sleeve 78 is then clipped off immediately above the sleevelock 50.

Alternate Embodiments

Figure 6:
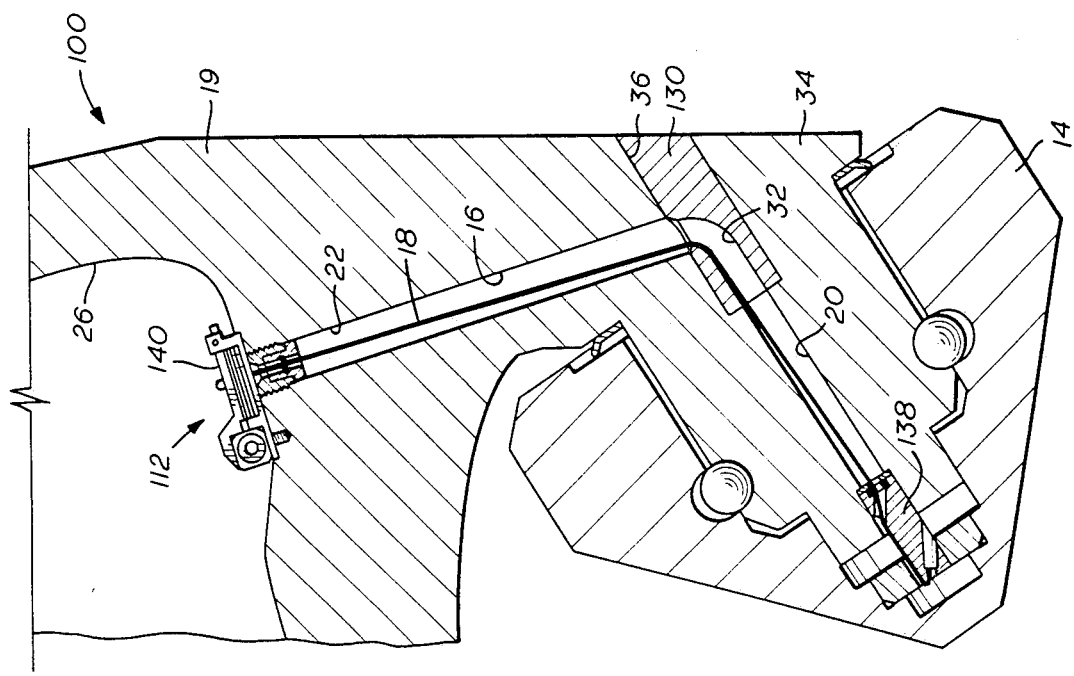
FIG. 6 is a view in vertical section of a single leg of a rotary-cone bit generally similar to the embodiment of FIG. 2, but employing an abradable wear sensor.

The specific type of wear sensor 38 and flow resistance altering means 40 used are not critical to the present invention. FIG. 6 illustrates an alternate embodiment of a bit 100 incorporating a tensioned linkage type bit wear indicator 112 having a guide element 130 the same as that of the preferred embodiment, but incorporating a wear sensor 138 and flow resistance altering means 140 quite different from those of the preferred embodiment.

Figure 7:
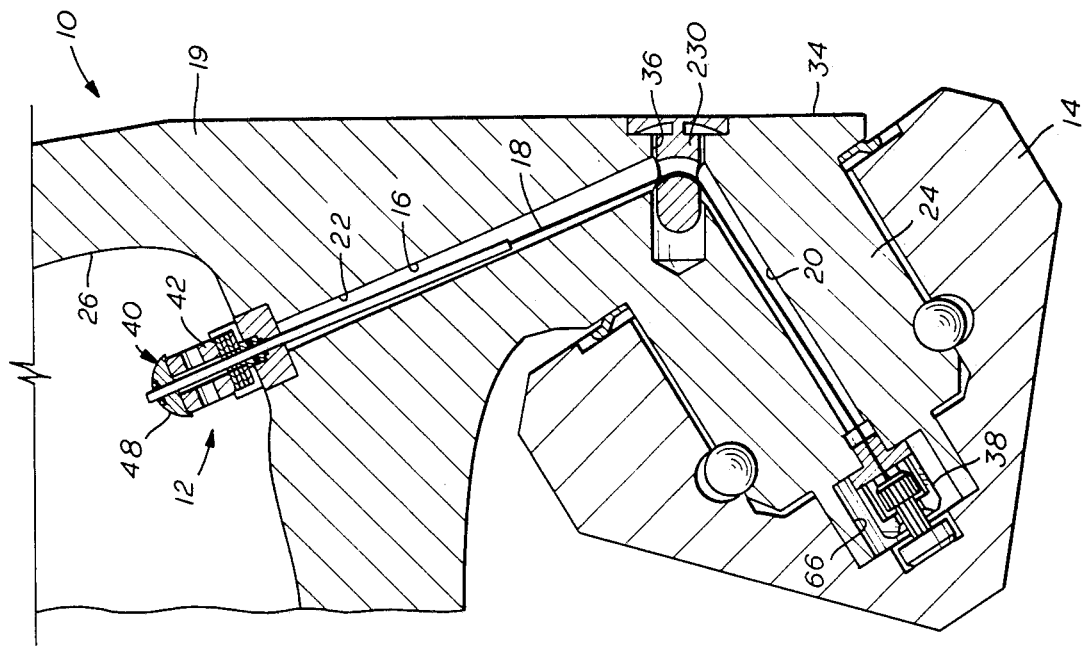
FIG. 7 is a view in vertical section of a single leg of a rotary-cone bit incorporating another embodiment of the present invention in which the guide element also serves as a gauge wear monitor.

FIGS. 5 and 7 illustrate two alternate embodiments of the present invention in which the guide element 230 is incorporated into a bit gauge wear sensor. In each of these embodiments, the guide element 230 has two principal portions: a large diameter outer portion 282 set in a corresponding aperture 284 in the bit shirt-tail 234; and a smaller diameter portion 286 projecting inward from the large diameter portion 282. The guide element passageway 232 is situated in the guide element smaller diameter portion 286. As the shirt-tail 234 wears, the guide element large diameter portion 282 wears with it. After sufficient wear, the smaller diameter portion 286 breaks free from the large diameter portion 282 and moves inward through the bore 236, reducing the tension on the tensioned linkage 218. This activates the flow resistance altering means 240, releasing the blocking element 242. This gauge wear sensor can be designed to trigger at any desired degree of gauge reduction by varying the wall thickness of the guide element large diameter portion 282.

The preferred embodiments of the present invention have been described above. It should be understood that the foregoing description is intended only to illustrate certain preferred embodiments of the invention and is not intended to define the invention in any way. Other embodiments of the invention can be employed without departing from the full scope of the invention as set forth in the appended claims.

We claim:

1. A drill bit, comprising:
   a main bit body defining a central chamber;
   at least one port in said main bit body, said port establishing a fluid pathway between said central chamber and the exterior of said main bit body;
   at least one spindle extending from said main bit body;
   a cutting element rotatably secured on said spindle;
   a sensor secured to said spindle to detect wear of the interface between said spindle and cutting element;
   means for altering the fluid flow resistance of said port in response to said sensor detecting a predetermined degree of wear;
   a first passageway segment extending through said spindle;
   a second passageway segment extending through said main bit body from a position proximate said central chamber to a position proximate said first passageway segment;
   a guide element inserted into said main bit body, said guide element defining a passageway connecting said first and second passageway segments to one another; and
   a tensioned linkage element extending through said first passageway segment, said guide element and said second passageway segment, said tensioned linkage having a first end secured to said sensor and a second end secured to said flow resistance altering means.

2. The drill bit as set forth in claim 1, wherein said flow resistance altering means includes:
   a blocking element within said main bit body, said blocking element being adapted to at least partially block fluid flow through said port in response to said blocking element being released within said main bit body; and
   a release mechanism secured within said main bit body for releasably retaining said blocking element at an initial position within said bit body and for releasing said blocking element in response to a decrease in the tension of said tensioned linkage.

3. The drill bit as set forth in claim 1, wherein said main bit body includes a guide element bore, said guide element bore intersecting both of said first and second passageway segments, said guide element being situated in said guide element bore.

4. The drill bit as set forth in claim 1, wherein said tensioned linkage is a wire.

5. The drill bit as set forth in claim 3, wherein said guide element bore extends from a shirt-tail portion of said bit to a position beyond the intersection of said first and second passageway segments, said guide element having an outer portion of a first cross section secured proximate said shirt-tail, said guide element having an inner portion of a second, smaller cross section projecting into said bit through said bore, there being a gap between the interior end of said guide element and the end of said bore, whereby in response to said shirt-tail and outer guide element portion being worn to a predetermined degree, said guide element is released from its initial position and moves a spaced distance inward in said bore, thus reducing the tension on said tensioned linkage.

6. A method for establishing an angled conduit through a rotary-cone drill bit for the installation of a tensioned wire bearing monitor, said method comprising the steps of:
   drilling a first passageway segment through a spindle of said bit;
   drilling a second passageway segment in said bit, said second passageway segment extending from a central chamber within said bit to a position proximate said first passageway segment;
   drilling a bore in said bit, said bore intersecting said first and second passageway segments; and
   inserting a guide element into said bore, said guide element being adapted to guide a wire inserted through one of said first and second passageway segments into the other of said first and second passageway segments.

7. The drill bit as set forth in claim 3, wherein said guide element passageway defines a curved channel.

8. The method set forth in claim 6, wherein the step of drilling the first passageway segment includes drilling the first passageway segment fully through the bit to cause it to exit through the shirt-tail of said bit and wherein the step of drilling a bore includes using that portion of the first passageway segment extending through the shirt-tail as a pilot for said bore.

9. A method for installing a bearing wear indicator in a rotary-cone drill bit, comprising the steps of:
   drilling a first passageway segment through a spindle of said bit;
   drilling a second passageway segment extending from a central chamber of said bit to a position proximate said first passageway segment;
   drilling a bore in said bit, said bore commencing at a shirt-tail portion of said bit and intersecting both said first and second passageway segments;
   inserting a guide element in said bore, said guide element defining a curved guide passageway having a first end aligned with said first passageway segment and a second end aligned with said second passageway segment;
   extending a wire through said first passageway segment, said guide element passageway and said second passageway segment;
   connecting a bearing wear sensor to a first end of said wire proximate the entrance to said first passageway segment;
   connecting a second end of said wire to means for altering the drilling fluid flow resistance of said bit in response to a change in the tension of the wire; and
   tensioning said wire.

10. The method set forth in claim 9, wherein the step of drilling the first passageway segment includes drilling the first passageway segment fully through the bit to cause it to exist through the shirt-tail of said bit and wherein the step of drilling a bore includes using that portion of the first passageway segment extending through the shirt-tail as a pilot for said bore.

* * * * *